(12) United States Patent
Lee et al.

(10) Patent No.: US 7,504,753 B2
(45) Date of Patent: Mar. 17, 2009

(54) MOTOR

(75) Inventors: Sung Ho Lee, Anyang-si (KR); Jin Soo Park, Inchun-si (KR); Byung Taek Kim, Ansan-si (KR)

(73) Assignee: LG Electronics Inc., Seoul (KR)

( * ) Notice: Subject to any disclaimer, the term of this patent is extended or adjusted under 35 U.S.C. 154(b) by 220 days.

(21) Appl. No.: 11/312,524

(22) Filed: Dec. 21, 2005

(65) Prior Publication Data
US 2006/0202580 A1   Sep. 14, 2006

(30) Foreign Application Priority Data
Mar. 8, 2005   (KR)   ..................... 10-2005-0019139

(51) Int. Cl.
*H02K 21/12* (2006.01)
(52) U.S. Cl. .............................. 310/156.01; 310/156.08
(58) Field of Classification Search ................................
310/156.01–156.84
See application file for complete search history.

(56) References Cited

U.S. PATENT DOCUMENTS

| | | | |
|---|---|---|---|
| 5,302,876 A | | 4/1994 | Iwamatsu et al. |
| 5,378,953 A | * | 1/1995 | Uchida et al. ........... 310/156.59 |
| 5,452,590 A | * | 9/1995 | Vigili ............................... 66/8 |
| 5,831,365 A | | 11/1998 | Keim et al. |
| 6,218,753 B1 | | 4/2001 | Asano et al. |
| 6,703,741 B1 | * | 3/2004 | Ifrim ..................... 310/156.19 |
| 7,109,626 B2 | * | 9/2006 | McClelland et al. ........ 310/216 |
| 2003/0062792 A1 | | 4/2003 | Reiter, Jr. et al. |
| 2005/0023927 A1 | | 2/2005 | Inayama et al. |
| 2006/0181168 A1 | * | 8/2006 | Hargraves et al. ............. 310/90 |

FOREIGN PATENT DOCUMENTS

| | | |
|---|---|---|
| EP | 0 818 870 A1 | 1/1998 |
| EP | 1 032 115 A2 | 8/2000 |
| EP | 1 557 928 A1 | 7/2005 |
| JP | 62-193537 A | 8/1987 |
| JP | 07-264823 A | 10/1995 |
| JP | 2002-101583 A | 4/2002 |
| WO | WO-87/05164 A1 | 8/1987 |
| WO | WO-2004/004092 A1 | 1/2004 |

* cited by examiner

*Primary Examiner*—Nguyen N Hanh
(74) *Attorney, Agent, or Firm*—Birch, Stewart, Kolasch & Birch, LLP

(57) ABSTRACT

According to the disclosed motor, since the motor includes a rotor in which a plurality of core pieces and magnets are alternately arranged in the circumferential direction, magnetic flux of the magnets is prevented from flowing between the core pieces neighbored with each other in the circumferential direction and the leakage of the magnetic flux can be minimized. Since identical polarities of the magnets neighbored with each other in the circumferential direction face each other, the magnetic flux can be concentrated to the respective core pieces. Moreover, since the axial direction of the circumference of the core facing the stator in the circumferential direction is longer than the axial direction of other portions thereof, torque is increased and manufacturing costs are reduced.

19 Claims, 5 Drawing Sheets

MOTOR

BACKGROUND OF THE INVENTION

1. Field of the Invention

The present invention relates to a motor, and more particularly, to a motor having a rotor in which a plurality of core pieces and magnets are alternately arranged in the circumferential direction.

2. Description of the Related Art

FIGS. 1 to 3 are views illustrating an inner rotor motor among conventional motors.

As shown in FIGS. 1 to 3, the conventional motor is an inner rotor motor

The conventional motor shown in FIGS. 1 to 3 is an inner rotor motor in which a rotor 20 is rotatably installed in a stator 10 by a predetermined gap G and rotated due to the electromagnetic interaction between the rotor 20 and the stator 10.

The stator 10 includes a ring-shaped yoke 12, a plurality of teeth 14 radially arranged on the inner wall of the yoke 12, and coils 16 wound around the teeth 14 and electrically connected to an external electric power source.

The yoke 12 and the teeth 14 are formed by laminating a plurality of electric steel sheets.

The rotor 20 includes a cylindrical core 22 and a plurality of magnets 24 radially arranged in the core 22.

The core 22 may be formed with an axial hole 22' penetrating the axial center of the core 22 in the axial direction. In the axial hole 22' of the core 22, a rotation shaft (not shown) may be fitted to rotate together with the rotor 20.

The core 22 is also formed by laminating a plurality of electric steel sheets.

However, in the above mentioned conventional motor, as indicated by an arrow in FIG. 2, some of the magnetic flux of the magnets 24 leaks through the inner circumferential region between the magnets 24 and the axial hole 22' of the core 22 in the radial direction of the core 22. Thus, due to the loss of magnetic flux, the performance of the conventional motor is limited.

SUMMARY OF THE INVENTION

Therefore, the present invention has been made in view of the above and/or other problems, and it is an object of the present invention to provide a motor for minimizing leakage of magnetic flux of magnets.

In accordance with the present invention, the above and other objects can be accomplished by the provision of a stator of a motor including a stator and a rotor, disposed to correspond to the stator and rotated by the interaction of the rotor and the stator, in which a plurality of core pieces and magnets are alternately arranged in the circumferential direction.

Preferably, the motor further includes a core piece coupling device for coupling the core pieces to a single body.

Preferably, the core piece coupling device includes a pair of end plates disposed at the axial sides of the rotor, and a plurality of pins inserted in to the core pieces and having ends coupled with any one of the end plates.

The end plates are made of non-magnetic material.

The end plates have a configuration, in which the end plates can contact the magnets, to prevent the magnets from being separated in the axial direction.

A rotation shaft is integrally coupled with the center portions of the core pieces to rotate together with the core pieces, and the pair of end plates has a ring-shape through which the rotation shaft can pass.

The core pieces include stopper protrusions protruded toward the magnets in the circumferential direction of the rotor to prevent the magnets from being separated in the radial direction.

The stopper protrusions have a pair of stopper protrusions respectively contacting the lateral sides of the magnets in the radial direction of the rotor.

The stopper protrusions are respectively disposed at the lateral sides of the core pieces in the circumferential direction of the rotor, and keep a uniform gap between stopper protrusions neighbored with each other in the circumferential direction.

The axial length of the outer circumference of the core pieces facing the stator in the radial direction of the rotor is longer than the axial length of other portions thereof.

The axial length of the outer circumference of the core pieces facing the stator is at least equal to the axial length of the stator.

The axial length of the magnets is equal to the axial length f the core pieces.

The magnets are arranged in the circumferential direction such that identical polarities of neighboring magnets face each other.

Preferably, the rotor is manufactured by iron powder metallurgy.

The motor is an inner rotor motor in which the rotor is rotatably installed in the stator.

The object of the present invention can also be achieved by the provision of a stator of a motor including a stator, and a rotor, disposed to correspond to the stator and rotated by the interaction of the rotor and the stator, in which a plurality of magnets and core pieces manufactured by iron powder metallurgy are alternately arranged in the circumferential direction, wherein the magnets are arranged in the circumferential direction such that identical polarities of neighboring magnets face each other.

Preferably, the axial lengths of the outer circumferences of the core pieces and the magnets facing the stator in the radial direction of the rotor are longer than the axial length of other portions thereof, the axial lengths of the outer circumferences of the core pieces and the magnets facing the stator are at least equal to the axial length of the stator, and the magnets are arranged in the circumferential direction such that identical polarities of neighboring magnets face each other.

The rotor further includes a pair of non-magnetic end plates contacting the axial sides of the rotor, a plurality of pins inserted in to the core pieces and having ends coupled with any one of the end plates, and stopper protrusions protruded toward the magnets in the circumferential direction of the rotor to prevent the magnets from being separated in the radial direction.

The object of the present invention can also be accomplished by the provision of a stator of a motor including a stator, and a rotor, disposed to correspond to the stator and rotated by the interaction of the rotor and the stator, in which a plurality of magnets and core pieces manufactured by iron powder metallurgy are alternately arranged in the circumferential direction, wherein the magnets are arranged in the circumferential direction such that identical polarities of neighboring magnets face each other, and the axial lengths of the outer circumferences of the core pieces and the magnets are longer than the axial length of other portions thereof.

Preferably, the rotor further includes a pair of non-magnetic end plates contacting the axial sides of the rotor, a plurality of pins inserted in to the core pieces and having ends coupled with any one of the end plates, and stopper protrusions protruded toward the magnets in the circumferential direction of the rotor to prevent the magnets from being separated in the radial direction.

As described above in detail, according to the motor of the present invention, since magnetic flux of magnets cannot flow through between the core pieces neighboring in the circumferential direction and identical polarities of the magnets neighboring in the circumferential direction face each other, magnetic flux can be concentrated, thereby increasing torque per unit volume.

Additionally, according to the motor of the present invention, since the axial length of the circumference of the core facing the stator in the radial direction of the rotor is longer than the axial length of other portions thereof and at least equal to the axial direction of the stator, torque per unit volume is increased and manufacturing costs are reduced.

BRIEF DESCRIPTION OF THE DRAWINGS

These and/or other objects and advantages of the present invention will become apparent and more readily appreciated from the following description of the embodiments, taken in conjunction with the accompanying drawings, in which.

DESCRIPTION OF THE PREFERRED EMBODIMENTS

Hereinafter, embodiments of a motor according to the present invention will be described with reference to the accompanying drawings.

Several embodiments of the present invention may be described. Since the basic structure of the stator is identical to that of a conventional motor, a detailed description thereof will be omitted.

Figure 1:
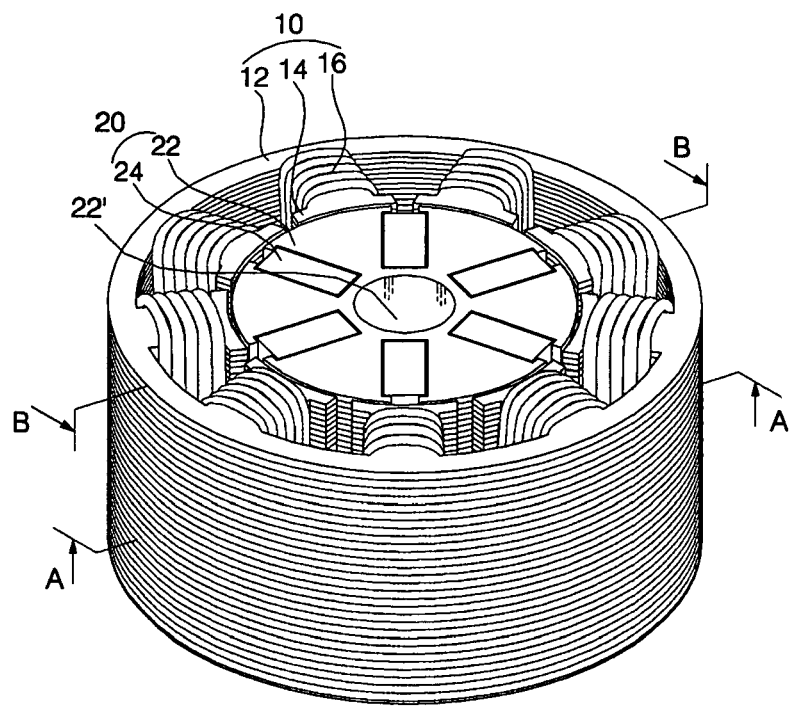
FIG. 1 is a perspective view illustrating a conventional motor.
Figure 2:
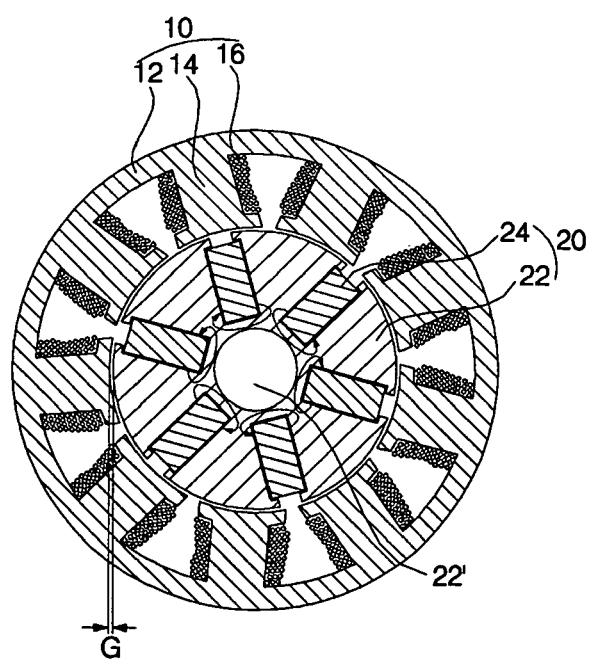
FIG. 2 is a sectional view taken along the line A-A in FIG. 1.
Figure 3:
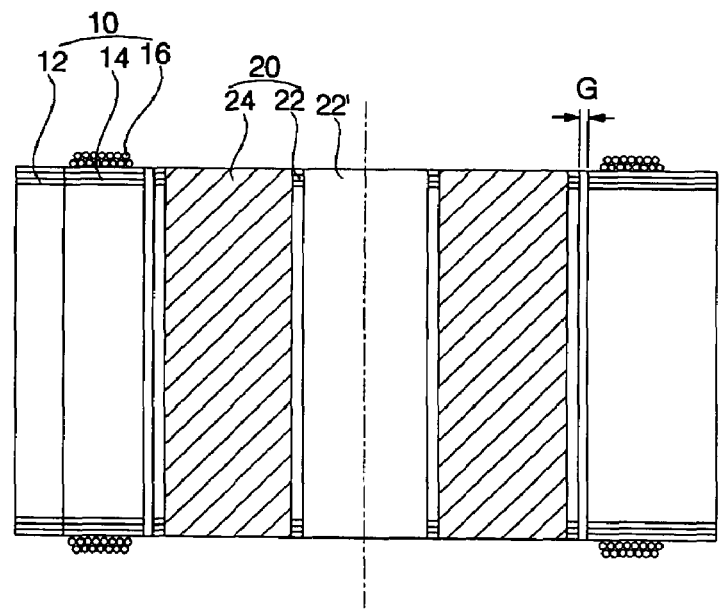
FIG. 3 is a sectional view taken along the line B-B in FIG. 1.
Figure 4:
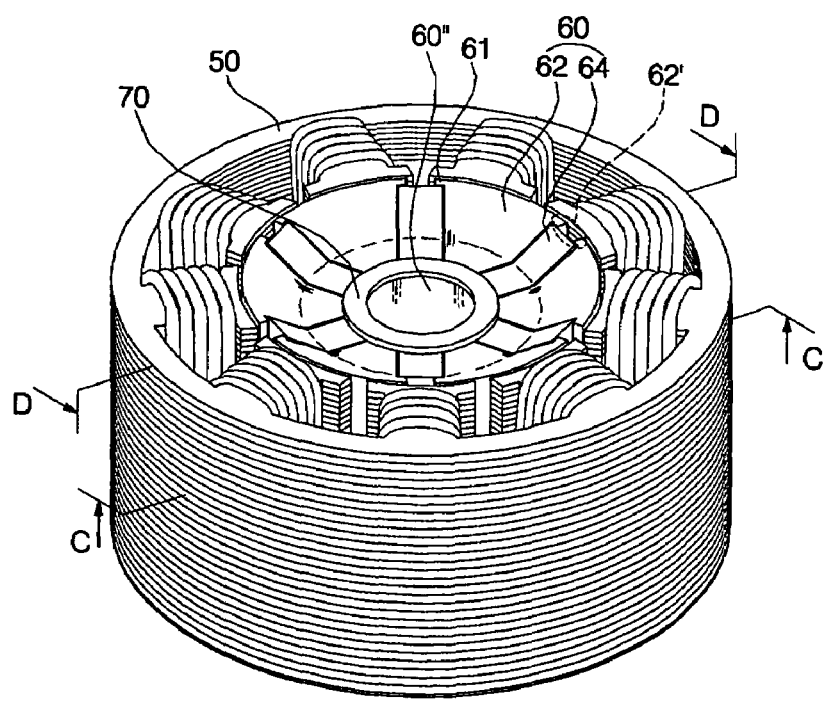
FIG. 4 is a perspective view illustrating a motor according to a preferred embodiment of the present invention.
Figure 5:
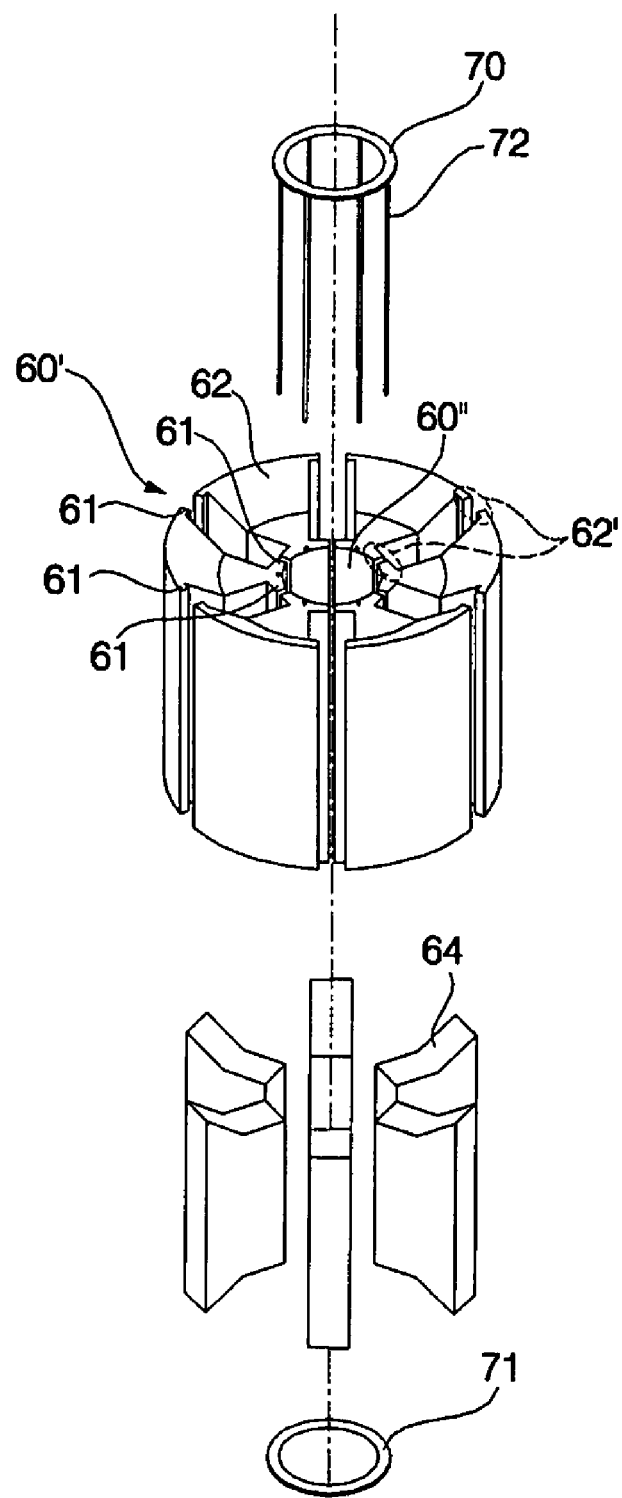
FIG. 5 is an exploded perspective view illustrating a rotor of the motor according to the preferred embodiment of the present invention.
Figure 6:
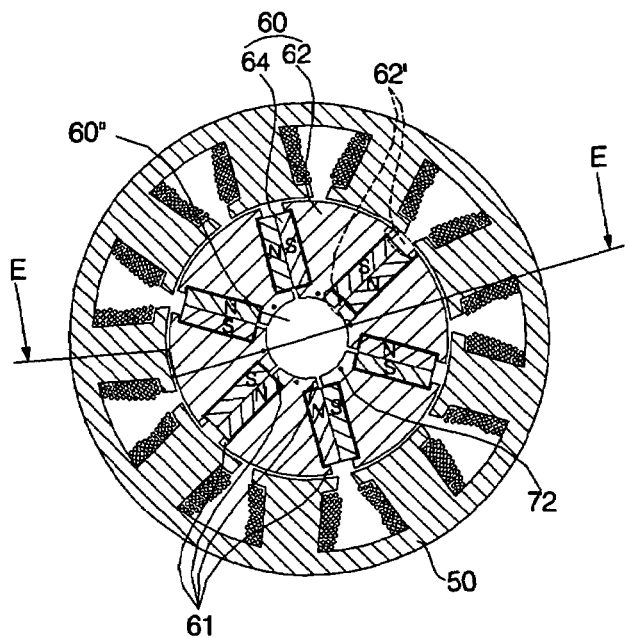
FIG. 6 is a sectional view taken along the line C-C in FIG. 4.
Figure 7:
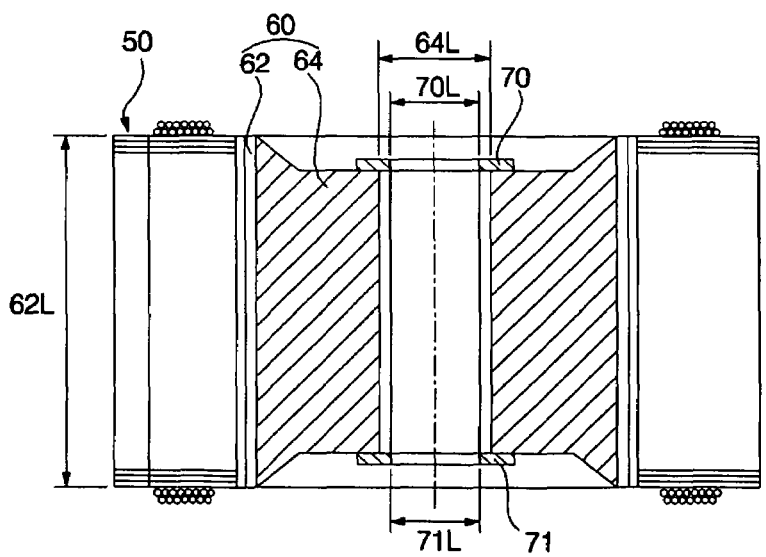
FIG. 7 is a sectional view taken along the line D-D in FIG. 4.
Figure 8:
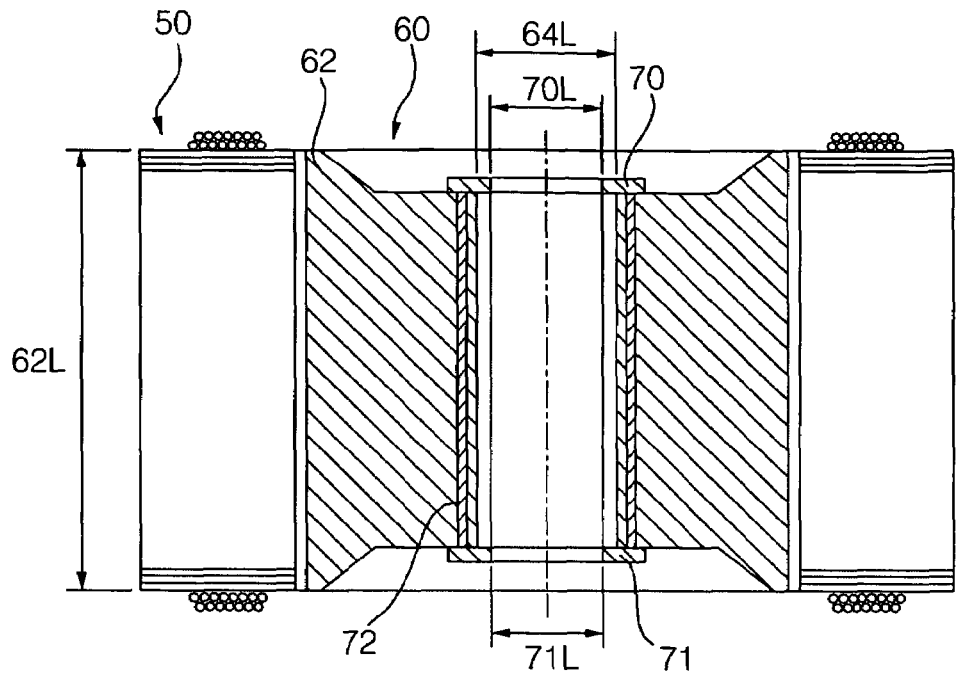
FIG. 8 is a sectional view taken along the line E-E in FIG. 6.

FIG. 4 is a perspective view illustrating a motor according to a preferred embodiment of the present invention, FIG. 5 is an exploded perspective view illustrating a rotor of the motor according to the preferred embodiment of the present invention, FIG. 6 is a sectional view taken along the line C-C in FIG. 4, FIG. 7 is a sectional view taken along the line D-D in FIG. 4, FIG. 8 is a sectional view taken along the line E-E in FIG. 6.

The motor shown in FIGS. 4 to 8 is an inner rotor motor in which a rotor 60 is rotatably installed in a stator 50, and includes a plurality of core pieces 62 and magnets 64 alternately arranged in the circumferential direction such that the rotor 60 is rotated due to electromagnetic interaction between the rotor 60 and the stator 50. A single rotor 60 is made of a combination of a plurality of core pieces 62 and the combination is referred to as a core 60'.

If the motor size is fixed, the large the surface of the core 60' facing the stator 50 is, that is, the larger the effective flux area is, the more minimized the magnetic reluctance is.

Thus, the core pieces 62 are preferably formed in the radial direction of the rotor 60 to have the same axial length 62L of the outer circumference facing the stator 50 as the axial length of the stator 50.

Moreover, in order to maximize the effective magnetic flux area and reduce material costs, the axial length of the outer circumferences of the core pieces 62 facing the stator 50 in the radial direction of the rotor 60 is preferably longer than the axial length of other portions of the core pieces 62.

The core pieces 62 have a desired shape such that the core 60' has a shaft hole 60", formed at the axial center, into which a rotation shaft is fitted.

Meanwhile, each of the core pieces 62 may have stopper protrusions 61 protruded toward the magnets 64 in the circumferential direction of the rotor 60 such that the magnets 64 are prevented from separating in the radial direction.

The stopper protrusions 61 may be formed at the ends of each of the core pieces 62 in the radial direction of the rotor 60 to contact the sides of the magnets 64 in the radial direction of the rotor 60.

Moreover, the stopper protrusions 61 may be formed in the lateral sides of the core pieces 62 in the circumferential direction of the rotor 60. In this case, the stopper protrusions 61 need to maintain a predetermined gap between the stopper protrusion 61 and another neighboring stopper protrusions 61 in the circumferential direction of the rotor 60 such that flux of the magnets 64 is prevented from flowing through spaces between the stopper protrusions 62. In other words, slots 62' are formed between the stopper protrusions 61.

The core pieces 62 are preferably made by iron powder metallurgy such that the configuration of the core 60' is easily designed.

The core pieces 62 of the core 60' may be connected to each other to form a single body by a core piece coupling device described as follows.

The core piece coupling device may include a pair of end plates 70 and 71 contacting the sides of the core 60' in the axial direction of the rotor 60, and a plurality of pins 72 inserted in to the core pieces 62 and having ends coupled with any one of the end plates 70 and 71.

Each of the end plates 70 and 71 is preferably made of non-magnetic material such that magnetic flux of the magnets 64 is prevented from leaking through the end plates 70 and 71.

The end plates 70 and 71 may take the form of a ring through which the rotation shaft can pass.

In order to prevent the magnets 64 from being separated in the axial direction, the end plates 70 and 71 may have a size sufficient to contact the magnets 64.

In other words, in ring-shaped end plates 70 and 71, the outer diameters 70D and 71D are larger than the length 64L between the magnets 64 opposite to each other in the radial direction of the rotor 60.

The pins 72 may be made of magnetic material or non-magnetic material.

If the end plates 70 and 71 and the pins 72 are made of the same material, the end plates 70 and 71 and the pins 72 can be formed in the rotor 60 constituted by the core pieces 62 and the magnets 64 by molding.

Otherwise, the end plates 70 and 71 and the pins may be coupled with each other by bonding, welding, or the like.

For overall configurative harmony of the rotor 60, the axial length of the magnets 64 may be equal to the length of the core pieces 62. In other words, like the core pieces 62, the axial length of the outer circumference of the magnets 64 facing the stator 50 in the radial direction of the rotor 60 is longer than other portions of the magnets 64, and is at least equal to the length of the stator 50.

The magnets 64 may be arranged in the circumferential direction such that the identical polarities of neighboring magnets 64 face each other. Then, the magnetic flux of the magnets 64 can be concentrated to the core pieces 62 so that torque per unit volume is increased.

The above-mentioned magnets 64 can be inserted into a mold of the core 60' when manufacturing the core 60' so that the magnets are integrated with the core 60'.

Otherwise, the magnets 64 may be coupled with the core pieces 62 by bonding, welding or the like.

Operation of the motor structured as described above will be described as follows.

When electric power is applied to the stator 50, the magnetic flux of the magnets 64 flows between the stator 50 and the core 60' so that the rotor 60 rotates.

At that time, since the identical polarities of the magnets 64 as the polarities of neighboring magnets 64 in the circumferential direction of the rotor 60 face each other, direction of the magnetic flux of the magnets 64 in respective core pieces 62 are uniform so that the magnetic flux of the magnets 64 is concentrated.

Moreover, since the magnetic flux of the magnets 64 cannot flow between the core pieces 62 neighbored with each other in the circumferential direction of the rotor 60, there is no leakage of the magnetic flux of the magnets 64.

Therefore, torque of the rotor 60 can be maximized.

Figure 9:
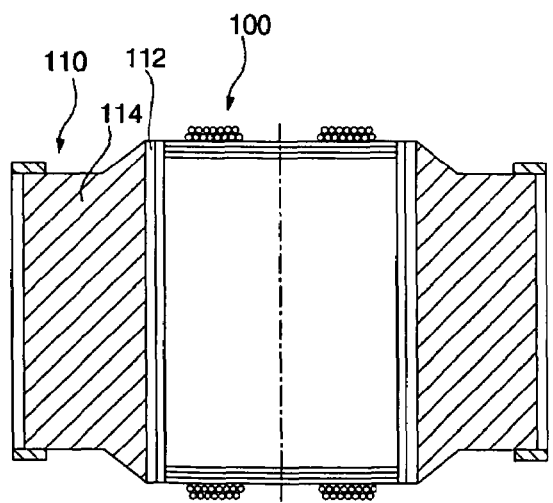
FIG. 9 is a sectional view illustrating a motor according to another preferred embodiment of the present invention.

Meanwhile, in the description of another preferred embodiment of the present invention with reference to FIG. 9, since the basic structure of another preferred embodiment of the present invention is substantially identical to the description of the first preferred embodiment of the present invention with reference to FIGS. 4 to 8, the detailed description of another preferred embodiment will be omitted.

FIG. 9 is a sectional view illustrating a motor according to another preferred embodiment of the present invention.

The motor in FIG. 9 is an outer rotor motor in which a rotor 110 is rotatably disposed at the outside of a stator 100.

In other words, the rotor 110 has a ring-shape in which a plurality of core pieces 112 and magnets 114 are alternately arranged.

The core pieces 112 are formed such that the axial length of the inner circumference of the core pieces 112, facing the stator 100 in the radial direction of the rotor 110, is longer than the axial length of other portions thereof, and at least equal to the length of the stator 100.

Particularly, the core pieces 112 are made of iron powder metallurgy, and are arranged to keep a predetermined gap between neighboring other core pieces 112 in the circumferential direction of the rotor 110.

The magnets 114 are arranged in the circumferential direction such that the identical polarities of neighboring magnets 114 face each other.

As described above in detail, according to the motor of the present invention, since magnetic flux of magnets cannot flow between the core pieces neighbored with each other in the circumferential direction, there is no leakage of magnetic flux and torque per unit volume can be increased.

Moreover, according to the motor of the present invention, since the magnets are arranged such that the identical polarities of magnets neighbored with each other in the circumferential direction face each other, the magnetic flux can be concentrated, thereby increasing torque per unit volume.

Additionally, according to the motor of the present invention, since the axial length of the circumference of the core facing the stator in the radial direction of the rotor is longer than the axial length of other portions thereof and at least equal to the axial direction of the stator, torque per unit volume is increased and manufacturing costs are reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A motor comprising:
   a stator; and
   a rotor, disposed to correspond to the stator and rotated by the interaction of the rotor and the stator, in which a plurality of core pieces and magnets are alternately arranged in the circumferential direction,
   wherein the axial length of the outer circumference of the core pieces facing the stator in the radial direction of the rotor is longer than the axial length of other portions thereof, and
   wherein the axial length of the core pieces becomes shorter gradually from the outer circumference of the core pieces to a predetermined portion of the core pieces spaced apart inward from the outer circumference of the rotor.

2. The motor as set forth in claim 1, further comprising a core piece coupling device for coupling the core pieces to a single body.

3. The motor as set forth in claim 2, wherein the core piece coupling device comprises:
   a pair of end plates disposed at the axial sides of the rotor; and
   a plurality of pins inserted in to the core pieces and having ends coupled with any one of the end plates.

4. The motor as set forth in claim 3, wherein the end plates comprise non-magnetic material.

5. The motor as set forth in claim 3, wherein the end plates have a configuration, in which the end plates can contact the magnets, to prevent the magnets from being separated in the axial direction.

6. The motor as set forth in claim 3, wherein a rotation shaft is integrally coupled with the center portions of the core pieces to rotate together with the core pieces, and the pair of end plates has a ring-shape through which the rotation shaft can pass.

7. The motor as set forth in claim 6, wherein the stopper protrusions are respectively disposed at the lateral sides of the core pieces in the circumferential direction of the rotor, and keep a uniform gap between stopper protrusions neighbored with each other in the circumferential direction.

8. The motor as set forth in claim 1, wherein the core pieces include stopper protrusions protruded toward the magnets in the circumferential direction of the rotor to prevent the magnets from being separated in the radial direction.

9. The motor as set forth in claim 8, wherein the stopper protrusions have a pair of stopper protrusions respectively contacting the lateral sides of the magnets in the radial direction of the rotor.

10. The motor as set forth in claim 9, wherein the axial length of the magnets is equal to the axial length of the core pieces.

11. The motor as set forth in claim 1, wherein the axial length of the outer circumference of the core pieces facing the stator is at least equal to the axial length of the stator.

12. The motor as set forth in claim 1, wherein the magnets are arranged in the circumferential direction such that identical polarities of neighboring magnets face each other.

13. The motor as set forth in claim 1, wherein the rotor is manufactured by iron powder metallurgy.

14. The motor as set forth in claim 1, comprising an inner rotor motor in which the rotor is rotatably installed in the stator.

15. A motor comprising:
   a stator; and
   a rotor, disposed to correspond to the stator and rotated by the interaction of the rotor and the stator, in which a plurality of magnets and core pieces manufactured by iron powder metallurgy are alternately arranged in the circumferential direction;
   wherein the magnets are arranged in the circumferential direction such that identical polarities of neighboring magnets face each other,
   wherein the axial length of the outer circumference of the core pieces facing the stator in the radial direction of the rotor is longer than the axial length of other portions thereof, and
   wherein the axial length of the core pieces becomes shorter gradually from the outer circumference of the core pieces to a predetermined portion of the core pieces spaced apart inward from the outer circumference of the rotor.

16. The motor as set forth in claim 15, wherein the axial lengths of the outer circumferences of the core pieces and the magnets facing the stator are at least equal to the axial length of the stator, and the magnets are arranged in the circumferential direction such that identical polarities of neighboring magnets face each other.

17. The motor as set forth in claim 15, wherein the rotor further comprises:
   a pair of non-magnetic end plates contacting the axial sides of the rotor;
   a plurality of pins inserted in to the core pieces and having ends coupled with any one of the end plates; and
   stopper protrusions protruded toward the magnets in the circumferential direction of the rotor to prevent the magnets from being separated in the radial direction.

18. A motor comprising:
   a stator; and
   a rotor, disposed to correspond to the stator and rotated by the interaction of the rotor and the stator, in which a plurality of magnets and core pieces manufactured by iron powder metallurgy are alternately arranged in the circumferential direction;
   wherein the magnets are arranged in the circumferential direction such that identical polarities of neighboring magnets face each other, and the axial lengths of the outer circumferences of the core pieces and the magnets are longer than the axial length of other portions thereof, and
   wherein the axial length of the core pieces becomes shorter gradually from the outer circumference of the core pieces to a predetermined portion of the core pieces spaced apart inward from the outer circumference of the rotor.

19. The motor as set forth in claim 18, wherein the rotor further comprises:
   a pair of non-magnetic end plates contacting the axial sides of the rotor;
   a plurality of pins inserted in to the core pieces and having ends coupled with any one of the end plates; and
   stopper protrusions protruded toward the magnets in the circumferential direction of the rotor to prevent the magnets from being separated in the radial direction.

* * * * *